(12) United States Patent
Van Patten et al.

(10) Patent No.: US 12,106,316 B1
(45) Date of Patent: Oct. 1, 2024

(54) COUNTING MACHINE FOR DATA AND CONFIDENTIAL PERSONALIZATION OF PROPRIETARY ENTITY RATINGS VIA MINKOWSKI-DISTANCE SEMI-SUPERVISED MACHINE LEARNING

(71) Applicant: ESG-Rate, Inc., Jupiter, FL (US)

(72) Inventors: Michael Van Patten, Norwalk, CT (US); Lawrence C. Rafsky, Jupiter, FL (US); Thomas J. Saleh, Stamford, CT (US); Laura C. Trumbull, West Chester, PA (US)

(73) Assignee: ESG-Rate, Inc., Jupiter, FL (US)

( * ) Notice: Subject to any disclaimer, the term of this patent is extended or adjusted under 35 U.S.C. 154(b) by 0 days.

(21) Appl. No.: 18/584,074

(22) Filed: Feb. 22, 2024

(51) Int. Cl.
*G06Q 30/0203* (2023.01)
*G06F 3/0482* (2013.01)

(52) U.S. Cl.
CPC ....... *G06Q 30/0203* (2013.01); *G06F 3/0482* (2013.01)

(58) Field of Classification Search
CPC ........ G06Q 10/00–50/00; G06F 1/00–2123/00
USPC .............................. 705/7.11–7.42
See application file for complete search history.

(56) References Cited

U.S. PATENT DOCUMENTS

| | | | | |
|---|---|---|---|---|
| 6,438,579 B1 * | 8/2002 | Hosken | ................ | G06Q 30/02 707/999.005 |
| 6,892,178 B1 * | 5/2005 | Zacharia | ................ | G06Q 30/02 705/7.29 |
| 6,996,572 B1 * | 2/2006 | Chakrabarti | ........ | G06F 16/9538 707/999.102 |
| 7,155,401 B1 * | 12/2006 | Cragun | .............. | G06Q 30/0254 705/14.1 |
| 7,440,943 B2 * | 10/2008 | Grasso | .................... | G06F 16/93 707/999.006 |
| 7,908,183 B2 * | 3/2011 | Jacobi | ................ | G06Q 30/0633 705/26.7 |

(Continued)

OTHER PUBLICATIONS

Liu, Gongshen, et al. "An Entity-Association-Based Matrix Factorization Recommendation Algorithm." Computers, Materials & Continua 58.1 (Year: 2019).*

(Continued)

*Primary Examiner* — Alan S Miller
(74) *Attorney, Agent, or Firm* — Gearhart Law, LLC (57) ABSTRACT

A machine for choosing among possible entities is disclosed comprising an electronic device with a display, a user interface and a memory storage storing a table listing predetermined attribute preferences associated with index numbers computed from user rankings. Influencing factors are displayed and partially ranked by the user. The top influencing factors are selected from a first menu and the least important factors chosen in a second menu which is adaptive to the first menu selections. The machine further includes a counting circuit, and an input-output device driver. The input-output device driver transmits the top ranks and the bottom ranks to the counting circuit, which determines the index number corresponding to the mapping of the top ranks and the bottom ranks. The memory storage unit retrieves the predetermined entity ranking associated with the mapping, derived from experts in the field, opinions of consumers, and machine learning, and displays it.

22 Claims, 3 Drawing Sheets

(56) References Cited

U.S. PATENT DOCUMENTS

| | | | | |
|---|---|---|---|---|
| 8,352,331 B2* | 1/2013 | Dunning | | G06F 16/40 |
| | | | | 705/26.7 |
| 8,874,477 B2* | 10/2014 | Hoffberg | | G06Q 20/065 |
| | | | | 705/37 |
| 9,818,136 B1* | 11/2017 | Hoffberg | | G07F 17/323 |
| 9,953,372 B1* | 4/2018 | Dziabiak | | G06Q 40/08 |
| 10,242,019 B1* | 3/2019 | Shan | | G06N 7/01 |
| 10,867,000 B2* | 12/2020 | Ahlstrom | | G06F 16/9535 |
| 10,909,442 B1* | 2/2021 | Szarvas | | G06N 3/08 |
| 11,360,987 B2* | 6/2022 | Jain | | G06F 16/288 |
| 11,539,657 B2* | 12/2022 | Rapaport | | H04L 67/306 |
| 2001/0016906 A1* | 8/2001 | Brebner | | G06F 16/972 |
| | | | | 713/150 |
| 2001/0034631 A1* | 10/2001 | Kiselik | | G16H 10/20 |
| | | | | 705/37 |
| 2003/0182310 A1* | 9/2003 | Charnock | | G06F 16/38 |
| 2004/0215607 A1* | 10/2004 | Travis, Jr. | | G06F 16/9538 |
| 2006/0129595 A1* | 6/2006 | Chen | | G06F 16/283 |
| | | | | 707/999.102 |
| 2007/0087756 A1* | 4/2007 | Hoffberg | | G06Q 10/06375 |
| | | | | 455/450 |
| 2007/0208613 A1* | 9/2007 | Backer | | G06Q 10/107 |
| | | | | 702/182 |
| 2014/0025673 A1* | 1/2014 | Sinha | | G06Q 10/101 |
| | | | | 707/E17.014 |
| 2018/0336638 A1* | 11/2018 | Dziabiak | | G06F 7/08 |
| 2019/0108217 A1* | 4/2019 | Chen | | G06F 40/289 |
| 2022/0343190 A1* | 10/2022 | Kwok | | G06F 3/0482 |

OTHER PUBLICATIONS

Agrawal et al., "Fast Algorithms for Mining Association Rules", Proceedings 20th International Conference on Very Large Databases, Sep. 1994, pp. 487-499.

"Industry leading product recommendations that drive real results", Dynamic Yield, Website Link: https://www.dynamicyield.com/recommend/, retrieved on Mar. 26, 2024, p. 9.

"Craft highly personalized experiences based on behavior and intent, not just demographics", Lytics: A Decision Engine, CDP, Website Link: https://www.lytics.com/decision-engine/?utm_term=product%20recommendation%20software&utm, retrieved on Mar. 26, 2024, p. 21.

"AI-Powered Product Recommendations", Bloom Reach: Product Recommendation Engine; Website Link: https://visit.bloomreach.com/product-recommendations?utm_source=adwords-search&utm_medium=paid&utm_campaign=Product, retrieved on Mar. 26, 2024, p. 11.

Taherdoost et al., "Multi-Criteria Decision Making (MCDM) Methods and Concepts"; Encyclopedia 2023, vol. 3, pp. 77-87.

* cited by examiner

COUNTING MACHINE FOR DATA AND CONFIDENTIAL PERSONALIZATION OF PROPRIETARY ENTITY RATINGS VIA MINKOWSKI-DISTANCE SEMI-SUPERVISED MACHINE LEARNING

FIELD OF THE EMBODIMENTS

Embodiments generally relate to employing a counting machine for data and confidential personalization of proprietary entity ratings and, in particular, by integrating the process of Minkowski-distance semi-supervised machine learning.

BACKGROUND OF THE EMBODIMENTS

Typically, an entity refers to a member of a collection of similar objects, with each object being an entity. Examples of entities include companies, politicians, cities, automobiles, restaurants, stocks, bonds, ETFs, and/or mutual funds. In many endeavors, a selection of entities of a certain type form a set, a subset of the full collection of all such entities, from which a consumer chooses one or more to engage with, whether it be through purchasing, investing, visiting, working for, living in, voting for, and/or other transactions and/or interactions. The selection process involves considering various factors. Factors are sets of values which measure, reflect, and rate various attributes of desirability, preference, or utility. In this invention, we focus on those factors whose values are ordered categorical values, commonly referred to as "ordinal data," As the name connotes, these values are ordered, and a variety of different such factors are applicable to each entity within the set of entities under consideration by the consume. Each factor belongs to a specific type that describes the attribute it pertains to. For example, when an entity is a city, each city may be evaluated on a scale of 1 to 10 (1 being the lowest rank associated with being undesirable, 10 being the highest rank associated with being more desirable) for factors such as air quality, minimal temperature extremes, crime rate, public transportation, quality of schools, probability of hurricanes, tornados, and/or floods, job opportunities, diversity, entertainment options, access to and quality of healthcare, traffic congestion, and shopping choices.

Factors applied to entities may encompass both subjective judgments and objective facts. These factors, are typically known as criteria and may influence the process of making one or more selections of entities from a set. This process is often referred to as multiple criteria decision making (MCDM) or multiple criteria decision analysis (MCDA). Some of the factors may be related to corporate responsibility and are typically known as environmental, social, and governance (ESG) factors. ESG factors may be applied to entities such as corporations. The relationships among these factors can be strong, weak, or non-existent. The factors may include evaluations of energy and climate change activities and impact, environmental policy and reporting, product sustainability policy and record, resource management policy and record, community development and philanthropy, compensation benefits, diversity and labor rights policy and record, human rights and supply chain policy and record, board of directors diversity, leadership ethics policy and record, training safety and employee health policy and record, and transparency and reporting policy and record.

Typically, a consumer is an individual who may engage with an entity in a transaction or interaction. A rating may include a simple score, an ordered categorical value, typically a letter grade with an optional + or −, like B+. Currently several challenges are posed in decision-making when a consumer is choosing among a set of choices, even with accurate rating scores obtained through extensive analysis. While multiple criteria decision making may be applied to numeric data, when dealing specifically with ordered category values, multi-objective optimization is commonly used. However, the state-of-the-art approach for such problems is known as Pareto optimization and results in a set of choices incompatible with a system employing a single rating, typically known as a single entity composite rating, for each entity, considering all factors. Problems occur when using a set of ratings in currently known methods and may not provide consumers with a realistic, meaningful, simple, or actionable guide to behavior. In the formal study of choice in economics, this principle is known as All-Things-Considered. Empirical evidence indicates that consumers' actual choices, their "revealed preferences," often fail to consider all factors in the real world. This underscores the significance and practicality of the invention described herein.

When comparing all factors for one entity with those of another entity, the process typically involves examining each factor individually and determining which entity has the higher factor rating, considering the underlying order for ordinal data. If the first entity has a higher factor rating than the second entity for all factors, it is said to dominate the second. However, the occurrence of this domination relationship is rare among pairs of entities in real-world problems. This scarcity is the reason why decision algorithms such as multiple criteria/objectives exist. This also underscores the necessity of the invention presented here.

Currently, a potential solution may involve calculating a single overall score for an entity by summarizing or consolidating the ratings across all factors. This process can be achieved through a MCDM/MCDA algorithm. However, when standard algorithms are employed for this purpose, they present specific challenges. These challenges may include the assumption of a numeric score, which is inappropriate for an ordinal factor and can lead to invalid conclusions. For instance, an "A" grade is not necessarily, or at all, four times more desirable to a consumer than a "D" grade, even though the numeric scores for these letters are typically taken to be 4 and 1 respectively. This approach to the decision making problem is known as scalarization or scalarizing, and has the flaw just illustrated. A different approach calls for a large number of pairwise comparisons between entities on various factors to be made. While this does not require scalarization, as direct one-to-one comparisons can be made with ordinal variables, when there is any significant number of entities, this becomes impractical as the number of entity pairs increases as the square of the number of entities. For example, there are over 6300 public companies with traded securities on major exchanges in the U.S., which means there are more than 39 million pair-wise comparisons. Even if all the pairwise comparisons are don, the results are only a set of possible choices with no clear winner, typically the Pareto Optimal set, as discussed earlier. This outcome often occurs because these algorithms use lexicographical comparison, also called non-dominated sorting. The theoretical literature consistently emphasizes that assuming a numeric score, particularly when combined with linear combinations or weighted averages, is notably inferior when compared to comparison methods, but current comparison methods are not practical, as discussed. The academic term for using and combining numeric scores is, as noted above, scalarization, and it is considered, at best, inferior to comparison methods and, at worst, a potential error.

SUMMARY OF THE EMBODIMENTS

The process of generating personalizing ratings for a specific set of entities and analyzing rating criteria involves the utilization of a counting machine. This counting machine facilitates and is in fact necessary for the generation of personalized ratings that are offered free to consumers while ensuring the secure concealment of the underlying basic entity ratings. This dual functionality preserves the commercial value associated with the fundamental ratings. The personalized ratings generated by the counting machine are designed to effectively address the MCDM/MCDA problem for individual consumers. The personalized ratings provide a solution to the decision-making challenges without encountering the inadequacies in the context of suboptimal solutions.

Additionally, the counting machine mechanism maintains confidentiality by refraining from revealing the underlying rating values and safeguarding the proprietary nature of the basic ratings. Moreover, the described counting machine may produce a single rating value, including the highest rating value for any given entity along with the corresponding entity. This output serves as a de facto recommendation for an individual to eliminate the complexities associated with presenting multiple factors and/or a list of potential alternatives. Consequently, the counting machine functions as a guide to action rather than a data-producing tool. This characteristic makes it particularly appealing to busy and/or attention-challenged consumers, streamlining the decision-making process by providing a clear and actionable recommendation.

The concealment of multi-factor ratings within the counting machine represents one of its key attributes; the machine prevents back-solving and/or reverse engineering. In other words, the counting machine prevents an attempt by a third party to deduce the underlying basic entity rating values (across factors) from a reasonably-sized sample of personalized ratings, even with knowledge of the personalized factor-values used in the personalization calculation. The system achieves these objectives through the introduction of the counting machine. This counting machine not only pioneers a solution to the MCDM/MCDA problem but also ensures that the solution can be summarized into a single value, representing a singular choice. Importantly, the counting machine accomplishes this without exposing any information that could enable the back-solving of the underlying rating values. The operational mechanism involves users ranking their top three factors, with tied ranks permitted, and the option to select one or more and fewer than three factors. Following this, the counting machine prompts users to identify their lowest three factors and permitting tied ranks and the selection of fewer than three factors. Notably, at this stage, the counting machine withholds information about the underlying ratings of the factors chosen as top or lowest preferences. This approach enhances the security and confidentiality of the underlying rating values, preventing reverse engineering and ensuring the robustness of the personalized rating system.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DESCRIPTION OF THE PREFERRED EMBODIMENTS

Figure 1:
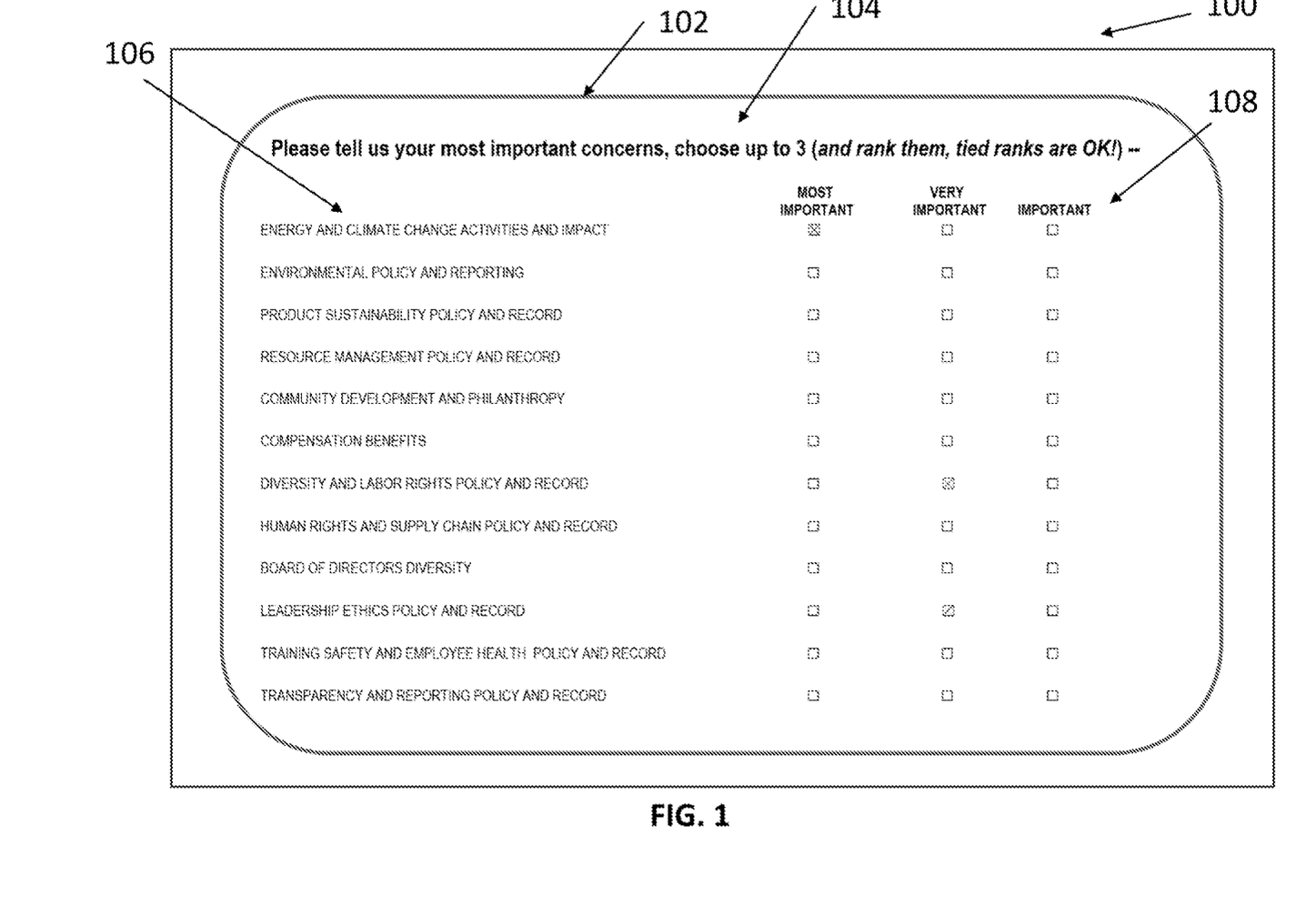
FIG. 1 is an illustration of a device showing an operational sequence that may be performed when running a counting machine system, according to an example embodiment.
Figure 2:
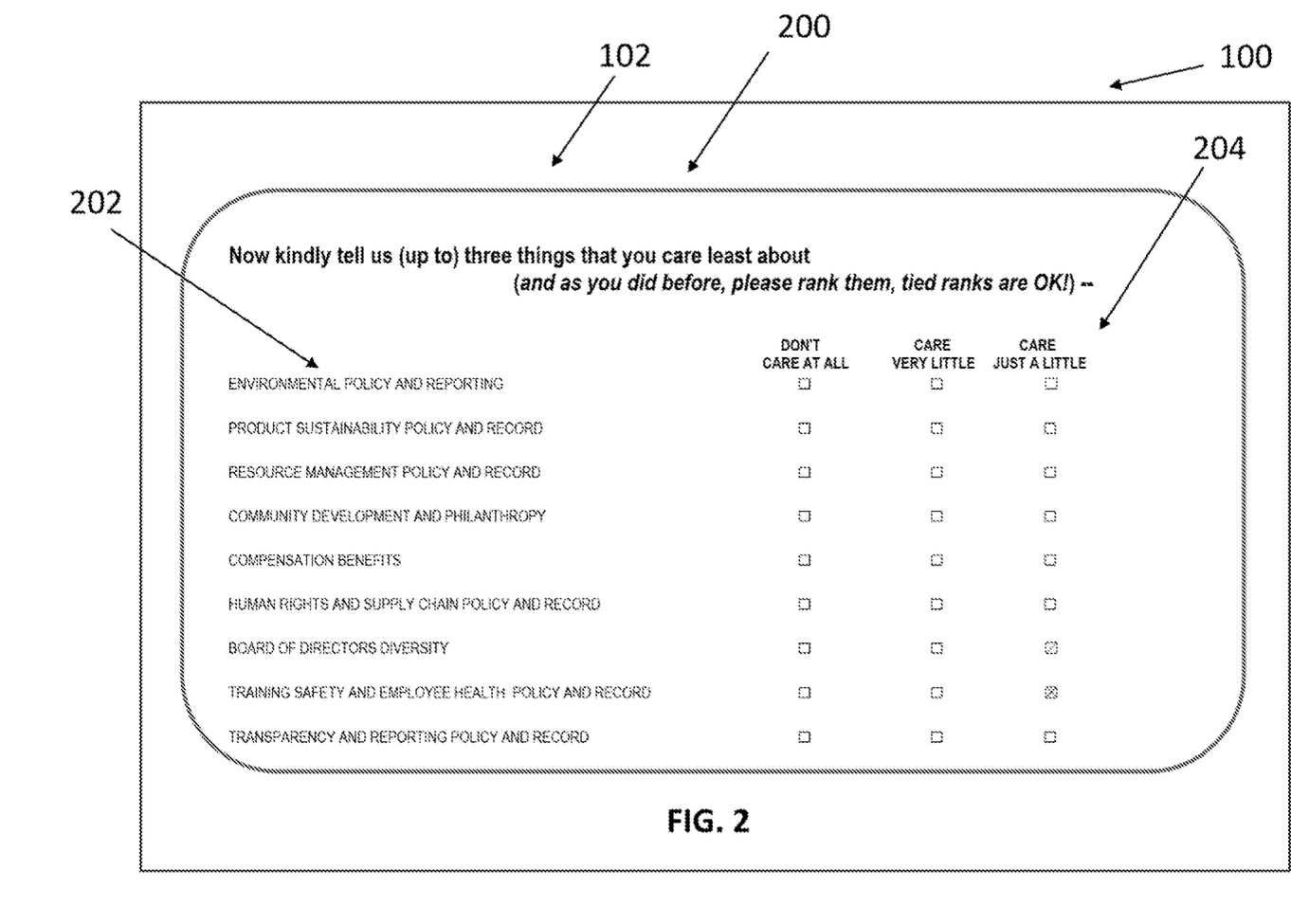
FIG. 2 is an illustration of a device showing an operational sequence that may be performed subsequent to the operational sequence when running the counting machine system of FIG. 1, according to an example embodiment.

FIGS. 1-2 illustrate example systems for a counting machine for data and confidential personalization of proprietary entity ratings by integrating the process of Minkowski-distance semi-supervised machine learning. Significant challenges in decision-making, when confronted with a set of options, occur even when comprehensive analysis establishes the accuracy of corresponding scores. The counting machine employs a decision-making system to address these many challenges, As a result, the counting machine is configured to guide individuals toward optimal choices. Notably, the counting machine safeguards the confidentiality of actual factor scores, ensuring that these scores, developed either by the counting machine manufacturer and/or licensed from experts, remain undisclosed to the end user to preserve their economic value.

For example, a scenario involving a professional city-rating firm that specializes in selling city-by-city ratings to commercial executive relocation consultancies may integrate its ratings into the described counting machine, and may be potentially implemented within an electronic device such as a tablet, a computer, and/or a mobile phone. The counting machine allows consumers to utilize the ratings without charge, ensuring the preservation of their commercial value. The city-rating firm, while offering the service for free, can generate revenue through mechanisms like advertising and the collection and sale of anonymized data from consumers using the counting machine.

Furthermore, the firm may enhance its commercial prospects by leveraging the name recognition garnered through the consumer-facing counting machine.

The system may employ the U.S. Grading System as an illustrative example, emphasizing that its usage does not impose constraints on the broader applicability of the invention detailed herein. The U.S. Grading System is a standard incorporating letter grades A/B/C/D/F, that will serve as a reference. Notably, the absence of the letter "E" is acknowledged, and "F" serves as a surrogate for "E." with the conceptual distance from D to F considered equivalent to other intervals, such as from C to D.

The grades A/A−/B+/B/B−/C+/C/C−/D+/D/F are employed, resulting in 11 rating grades. It is worth noting that A+ and D− are not utilized in this instance. Numeric values are typically assigned to these grades, such as A=4, B=3, C=2, D=1, F=0, with a + or − incrementing or decrementing by 0.25 or 0.3, depending on the grading institution. Despite the discussion regarding ordinal data emphasizing the error in treating these values as actual measurements, it is acknowledged that the distinctions between grades are implied, for example, the difference between B and B− is considered greater than from B− to C+. While this system leverages the 11-grade system as an illustrative example, the system extends to all analogous rating scale systems. This encompasses, without limitation, the scales utilized by the debt-rating, the financial stability rating, and the ESG rating scales of Moody's, S&P, Fitch, DBRS, and A.M. Best, such as AAA, AA, A, BBB, BB, B, CCC, CC, C, D, or Aaa, Aa, A, Baa, Ba, B, Caa, Ca, and/or C.

The following set of criteria is presented as an example, pertaining to the assessment of entities, with an emphasis on ESG (Environmental, Social, Governance) considerations. Each criterion is categorized under the respective E, S. or G dimension:
- E—ENERGY AND CLIMATE CHANGE ACTIVITIES AND IMPACT
- E—ENVIRONMENTAL POLICY AND REPORTING
- E—PRODUCT SUSTAINABILITY POLICY AND RECORD
- E—RESOURCE MANAGEMENT POLICY AND RECORD
- S—COMMUNITY DEVELOPMENT AND PHILANTHROPY
- S—COMPENSATION BENEFITS
- S—DIVERSITY AND LABOR RIGHTS POLICY AND RECORD
- S—HUMAN RIGHTS AND SUPPLY CHAIN POLICY AND RECORD
- G—BOARD OF DIRECTORS DIVERSITY
- G—LEADERSHIP ETHICS POLICY AND RECORD
- G—TRAINING SAFETY AND EMPLOYEE HEALTH POLICY AND RECORD
- G—TRANSPARENCY AND REPORTING POLICY AND RECORD This set of criteria provides an example framework for evaluating one or more entities across diverse dimensions, encompassing environmental sustainability, social responsibility, and/or governance practices. The detailed breakdown within each category emphasizes a nuanced assessment, aligning with standards associated with ESG considerations.

Another illustrative example includes the ESG and/or corporate responsibility scale previously mentioned. A consumer may face a challenge when tasked with selecting one fund from among three options for a tax-advantaged retirement savings plan such as, a 401(k) program, where only a single choice is permitted. The decision-making scenario involves evaluating various factors related to environmental sustainability, social impact, and governance practices, adding an additional layer of intricacy to the selection process. The challenge lies in navigating the multifaceted landscape of ESG considerations to make an informed decision that aligns with the consumer's values and financial objectives within the constraints of the 401(k) framework.

FIG. 1 illustrates an example counting machine 100 employing a visual interface comprising a display screen 102 in accordance with embodiments. Sequentially, a primary menu 104 of an initial screen is displayed to a user (the user is not shown in the diagram), serving as the primary interface for the user. The primary menu 104 provides the user with a selection of one or more top rating factors 106, encompassing 12 elements, for example, categorized under "social concern" in this instance. Users are prompted to designate their top three preferences, assigning a rank 108 of 1, 2, or 3 to each, with the option for tied ranks or skipped ranks. It's important to note that the ranks function as a scale from 1 to 3, rather than an actual ranking, even though the user is instructed to rank; this is a key element of the invention. Subsequently, contingent upon user interactions with the primary menu 104, FIG. 2 illustrates a second screen dynamically generated, featuring content tailored in response to the user's input. In particular, the tailoring will, in producing a secondary menu, eliminate the top choices already made when asking the user for their bottom (lowest) choices.

FIG. 2 illustrates the example counting machine 100 employing the visual interface comprising the display screen 102 of FIG. 1 comprising a subsequent secondary menu 200 in accordance with some embodiments. The secondary menu 200 provides the user with a selection of one or more bottom rating factors 202. A user is directed to select their bottom preferences comprising of up to three factors of least importance to them and assigning a rank 204 accordingly, again the rank for each is 1, 2, or 3, with the option for tied ranks or skipped ranks. Notably, the adaptive nature of the second menu prohibits a factor chosen as a top preference from being simultaneously designated as a bottom preference. It is worth noting that the user opted for only two bottom choices, a permissible deviation.

When soliciting user input for ranking numerous factors, such as 12, for example, the counting machine 100 capitalizes on the recognition that an individual's top and bottom choices hold particular significance. The cognitive challenge posed by comprehensively assessing 12 choices or navigating elaborate rating scales underscores the rationale behind the limitation imposed on users to a 1 to 3 ranking scale and a selection of only 1 to 3 choices. This methodology may be effective for applications with factor counts ranging from approximately 6 to approximately 30, taking into account the constraints imposed by current interactive display hardware.

In an embodiment, an adaptive menu may be implemented by the counting machine. For example, choices designated as "top" by the user are excluded from subsequent "bottom" choice options. Adaptive menus represents a significant enhancement within our innovative approach to ranking factors. An adaptive menu may be designed to optimize the user experience by dynamically adjusting the available choices based on the user's prior selections. In the counting machine system, users are tasked with designating both top and bottom preferences among a set of options to facilitate a more tailored and user-centric decision-making process. The adaptive menus prevent redundancy and potential confusion for users. In an embodiment, once a user has made their initial top choices, the system excludes these factors from the pool of options when subsequently asking the user to designate bottom choices. This adaptability aims to reflect the evolving nature of the user's preferences and provides a more streamlined decision-making experience. For example, if a user initially selects factors A, B, and C as their top choices with assigned ranks, when the system later prompts the user to choose bottom preferences, factors A, B, and C would not be presented as possible options. This mechanism ensures that the same factors are not encountered in both top and bottom choice scenarios, offering a more personalized and efficient decision-making process. The adaptability of adaptive menus not only reduces cognitive load by avoiding redundant choices but also acknowledges the user's initial preferences. This user-centric design fosters a more engaging and intuitive experience, as the system actively tailors subsequent choices based on the user's unique interactions. Ultimately, adaptive menus contribute to the overall effectiveness and usability of our ranking system, enhancing user satisfaction and facilitating a more seamless decision-making process.

In an embodiment, a flexible selection may be implemented by the counting machine. For example, users may select only one, two, or three options for both top and bottom factors, facilitating the formation of a "preference vector" even though only from 2 to 6 factors are rated. The concept of flexible selection within our innovative approach to ranking factors introduces a user-friendly feature that allows individuals to express their preferences in a nuanced manner. Specifically, users are granted the flexibility to choose one, two, or three options for both top and bottom factors. This adaptability in the number of choices is instrumental in facilitating the creation of what we term a "preference vector."

In practical terms, users are not constrained to a fixed number of selections for either top or bottom factors. Instead, they can express the intensity of their preferences by choosing one, two, or three options from the available set. This flexibility is particularly valuable when considering that, even though the system prompts users to rate only from 2 to 6 factors, they have the freedom to allocate their preferences within this range as they see fit. Typically a preference vector enables a user to convey a more nuanced and detailed set of preferences, representing the intensity and ranking of their choices across both top and bottom factors. For instance, a user might choose to emphasize their top preferences by selecting three factors and assigning different ranks to each, while, at the same time, expressing mild dissatisfaction with only two bottom factors and assigning equal ranks to both. This flexibility not only accommodates the diversity of user preferences but also contributes to the richness of the data collected. Users can effectively communicate the varying degrees of importance or disapproval for different factors, resulting in a more comprehensive understanding of their preferences. In summary, the flexible selection feature enhances the expressiveness of user input, allowing for a more nuanced and detailed representation of their preferences through the formation of a "preference vector."

In an embodiment, diverse ranking combinations may be implemented by the counting machine. For example, any combination of the three ranks is permitted, contrasting with rigid ranking schemes. This flexibility is desirable, as users may face uncertainty and doubt when forced to rank items without allowing ties. The diverse ranking combinations within the factor ranking introduces a level of flexibility that enables users to express their preferences in a more intricate manner. Unlike rigid ranking schemes, the machine counting system allows users the freedom to create diverse ranking combinations by assigning ranks to factors in any combination of the three available ranks. This contrasts with traditional ranking systems, where users are typically constrained to a specific order. In our approach, users can assign ranks of 1, 2, or 3 to their chosen factors, and these ranks are not limited to a single pattern. For example, a user can allocate all three ranks as 1, signifying equal importance to multiple factors, or they can distribute the ranks in a more varied manner, such as 1, 2, and 3. This flexibility accommodates the complexity of user preferences and allows for a more nuanced representation of their opinions.

The term "diverse ranking combinations" encapsulates the idea that users can utilize different combinations of the available ranks based on the relative importance or preference they attribute to each factor. This adaptability is particularly beneficial when users face difficulty in assigning strict, linear rankings or when they perceive multiple factors to be of equal significance. By allowing diverse ranking combinations, our system acknowledges the inherent subjectivity of user preferences and caters to the varying ways individuals prioritize different facts. This approach recognizes that users may have nuanced, multidimensional preferences that cannot be accurately captured through a one-size-fits-all ranking system. In summary, the introduction of diverse ranking combinations enhances the user experience by providing a more flexible and expressive means of conveying preferences. This adaptability ensures that the system accommodates the inherent complexity of user opinions, leading to a more accurate and detailed representation of their nuanced preferences.

Despite the flexibility offered to users—allowing a user to select 1, 2, or 3 choices independently for top and bottom selections, along with rating using any of the 27 combinations of 1, 2, and 3—there are still just under 18 million possible combinations. This information is instrumental in constructing the machine, which can assign an index value from 1 to 18 million (actually 17,919,198—hereafter we use ~18 MM to indicate this value, approximately 18 million) to any user's choice. The machine employs non-volatile memory chips to store pre-computed full preference vectors for each combination, retrieving them with simple address-line circuitry.

TABLE 1

6 × 3 data storage array.

| | | |
|---|---|---|
| 1 | 1 | 1 |
| 2 | 7 | 2 |
| 3 | 10 | 2 |
| 4 | 9 | 3 |
| 5 | 11 | 3 |
| 6 | null | null |

The counting machine mechanism can be implemented in a 6×3 data storage array illustrated in Table 1, where factors retain their original sequence number. For instance, a user's choice of three top factors (1, 7, and 10) with ranks 1, 2, and 2 (factors 7 and 10 are tied in the user's selection (respectively, and two bottom factors (9 and 11) with a tied rank of 3, signals a mild negative opinion. In relation to the 6×3 data storage array in Table 1, the top selection values are as follows: 1 gets 1, 7 gets 2, 10 gets 2. The bottom selection values are as follows: 9 gets 3, 11 gets 3. These numeric values directly map as an index value into the table with ~18 MM. The table contains the final factor ranking of the entities for each of the ~18 MM possible user-input preferences. To compute these entity rankings over all ~18 MM, a semi-supervised machine learning approach, such as the diffusion method, is employed, iteratively minimizing a Minkowski (L[p]) metric error function between the evaluation slot values and machine learning estimated values, for a value of p between 1 and 2, or as an option between A and B, where A is greater than 1 and less than B, and B is greater than A and less than 2, selected by the machine learning via a grid search, any step size allowed, in the interval of possible p values to achieve the smallest error over the grid. The Minkowski metric for p between 1 and 2 is selected because it is more difficult to empirically explore in reverse-engineering attacks than the Least Squares/Euclidean (L[2]) metric (i.e. p=2), or the Absolute Value/City Block/Taxicab/Manhattan (L[1] metric (i.e., p=1).

Two potential implementations for consumers include a smartphone application for instant product ratings based on user preferences and an integrated retail kiosk providing product rankings within a store. These implementations enable the collection of anonymous user preferences, rankings, and purchasing decisions, presenting substantial commercial value when aggregated and delivered to manufacturers or organizations overseeing the ranked items.

Figure 3:
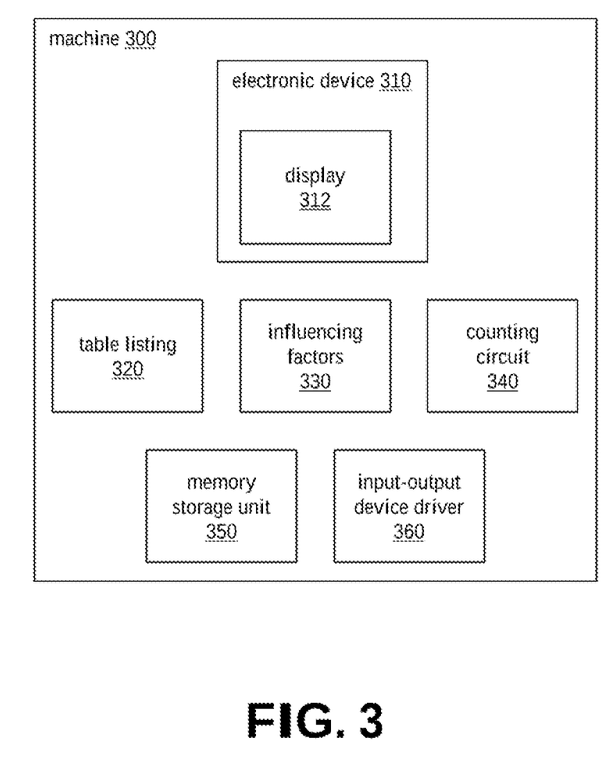
FIG. 3 is a block diagram illustrating the counting machine components in the counting machine of FIGS. 1 and 2, according to some embodiments of the present disclosure.

FIG. 3 is a block diagram that describes a machine 300, according to some embodiments of the present disclosure. In some embodiments, the machine 300 may include an electronic device 310, a memory storage unit 350 configured to store the table listing, and a counting circuit 340. The machine 300 may also include a table listing 320, the table listing retaining one or more predetermined attribute preferences-to-entity rankings each associated with an index number. The machine 300 may also include one or more influencing factors 330, each of the one or more influencing factors 330 may be configured to be displayed to a user via the GUI and selected by the user, the selected influencing factors used to change subsequent displays.

In some embodiments, the machine 300 may also include an input-output device driver 360 may be electrically connected to the counting circuit 340, the input-output device driver 360 may be configured transmit the top ranks and the bottom ranks to the counting circuit 340, the counting circuit 340 to determine the index number of the table listing that corresponds to a mapping of the top ranks and the bottom ranks, the memory storage unit 350 to retrieve a predetermined attribute preferences-to-entity ranking associated with the mapping of the top ranks and the bottom ranks and transmit the predetermined attribute preferences-to-entity ranking to the display 312 of the electronic device 310. The electronic device 310 may include a display 312 with a graphic user interface (GUI). A first set of three or less influencing factors to form a top rank of at most 3 parameter values displayed in a first menu and a second set of three or less influencing factors to form a bottom rank of at most 3 parameter values displayed in a second menu, the second menu being adaptive to choices made in the first menu.

In some aspects, the techniques described herein relate to a machine including: an electronic device, the electronic device has a display with a GUI; a table listing, the table listing retaining one or more predetermined attribute preferences-to-entity rankings each associated with an index number, one or more influencing factors, each of the one or more influencing factors are configured to be displayed to a user via the GUI and selected by the user, the selected influencing factors of the one or more influencing factors include a first set of three or less influencing factors to form a top rank set of at least 3 parameter values displayed in a first menu and a second set of three or less influencing factors to form a bottom rank set of at least 3 parameter values displayed in an second menu, the second menu is adaptive; a memory storage unit configured to store the table listing; a counting circuit; an input-output device driver is electrically connected to the counting circuit, the input-output device driver is configured transmit the top ranks and the bottom ranks to the counting circuit, the counting circuit to determine the index number of the table listing that corresponds to a mapping of the top ranks and the bottom ranks, the memory storage unit to retrieve a predetermined attribute preferences-to-entity ranking associated with the mapping of the top ranks and the bottom ranks and transmit the predetermined attribute preferences-to-entity ranking to the display of the electronic device.

In some aspects, the techniques described herein relate to a machine, wherein table listing includes one or more entries including corresponding answers for a user input selection.

In some aspects, the techniques described herein relate to a counting machine including a digital update mechanism configured to update data.

In some aspects, the techniques described herein relate to a counting machine with a memory storage unit, a counting circuit, an output-to-user device consisting of a display screen or audio output or both, an input/output device driver driving one of the following a keyboard or mouse-pointer or stylus or touch-screen device to allow the user to select one or more possible alternative influencing factors on a display screen or screens that have been marked for possible selection, such as (but not limited to) one or more check-boxes, and allows as well for modifications and edits before the user is done, where the memory unit stores a table of all possible user selections, each corresponding to actions by the user who chooses to rank (including tied ranks), his/her top N and bottom M number of the alternative influencing factors (factors that influence a particular decision among various entities), where N and M do not need to be equal, and do not need to be equal to 3, and as a result of the machine choosing from the memory storage unit a particular revealed preference set of ranking scoring weights, the particular weights specified by the user-input ranking counts produced by the counting circuit, via the counting circuit output of processed user inputs, outputs to the user that user's revealed preference ranking of the various entities being ranked using scoring weights previously stored, when the machine was put into service, on each of these influencing factors, such scores and weights being stored in the memory storage unit but neither output nor accessible to the user in any way.

In some aspects, the techniques described herein relate to a counting machine, where the calculation of revealed preferences is accomplished by looking up, in a pre-defined look-up table, stored in the memory storage unit, where the answer is given in the table by virtue of the table having entries and the corresponding answers for every possible user input selection.

In some aspects, the techniques described herein relate to a counting machine, where the list of factors, the list of entities scored or ranked on those factors, the actual scores or ranks of each item on each factor, the values of N and M, and the pre-defined look-up table for every possible user action, may be update from time-to-time by any digital update mechanism, including but not limited to downloading, streaming, insertion of media or a memory storage device.

In some aspects, the techniques described herein relate to a counting machine implemented for convenience on a digital computing device, including (but not limited to) a smart phone, a tablet, a personal computer, a dedicated kiosk, a common kiosk in a public place or a private commercial establishment, a computer server (dedicated or shared), or virtual computer server in the cloud.

In some aspects, the techniques described herein relate to a counting machine where the user answer is a single best choice of the items under consideration, taking all the revealed factor preferences into account.

In some aspects, the techniques described herein relate to a counting machine where the user is given a choice of the answer being a ranking of alternative entities, or the single best alternative entity, or a set of K best alternative entities, where K may be predetermined or specified by the user.

In some aspects, the techniques described herein relate to a counting machine where if a ranking is presented, the user can choose a partial ranking, for example top 3 choices, top 4 choices, and so on.

In some aspects, the techniques described herein relate to a counting machine where if a ranking is presented, the only type of ranking presented to the user is top K (no user choice), the value of K being set at the time the machine is created for a particular application and/or installed at a particular site.

In some aspects, the techniques described herein relate to a counting machine where the value of K can be updated from time-to-time by any digital update mechanism, including but not limited to downloading, streaming, insertion of media or a memory storage device.

In some aspects, the techniques described herein relate to a counting machine where the individual user-selected choices of the N top and M bottom factors, with the ranks assigned by the user, are stored in the memory storage unit of the machine once entered initially, so that these values are automatically used every subsequent time the individual uses the machine.

In some aspects, the techniques described herein relate to a machine where the user has the option of inputting a new set of selected factors and ranks, referred to as an option set, and having it used instead of a currently saved option set, as well as the choice of retaining one or more saved option sets under user-supplied names, plus the choice of selectively deleting named option sets, and also defining a number of options sets and their names in advance, for potential use at a later date. The total number of saved option sets, whether defined on-the-fly or in advance, can be limited either by the available memory on the machine, or alternatively by a pre-specified number X, specified when the machine is constructed or installed; the value of X can be updated from time-to-time by any digital update mechanism, including but not limited to downloading, streaming, insertion of media or a memory storage device.

In some aspects, the techniques described herein relate to a machine where the user can opt-out of or decline any options set whatsoever, as well as the choice of deleting permanently the prior used option set if one exists, and all named option sets if they exist.

In some aspects, the techniques described herein relate to a machine where, if the machine is implemented on a multi-user or shard computing device, each user (securely logging in via standard password protocols, including 2FA if desired or required in case of defining, editing, or deleting option sets) has their own set of stored option sets, with an opt-out option.

In some aspects, the techniques described herein relate to a counting machine where user inputs are recorded individually and also aggregated, then used to create a data channel for sale to, or other use by, the manufacturers, sellers, or other organizations in charge of management of the items being ranked, on both a real-time and periodic basis, with the data being transmitted either directly or to a central clearing facility, possibly a commercial facility, via any data distribution mechanism, including but not limited to uploading, streaming, creation of media or a memory storage device, or creation of printed reports.

In some aspects, the techniques described herein relate to a counting machine modified to make all data anonymous before processing and/or aggregating.

In some aspects, the techniques described herein relate to a counting machine modified to allow any users to opt-out. For example, the machine is configured to be modified to allow any users to opt-out of data collection, non-anonymous and/or anonymous, via a log-in mechanism.

In some aspects, the techniques described herein relate to a counting machine where usage has been limited via the built-in hardware counter to about one hundred thousand uses per user, or some other number Y of uses per user higher or lower, along with standard identity-checking mechanisms to block individual users from having multiple different accounts. The value of Y can be updated from time-to-time by any digital update mechanism, including but not limited to downloading, streaming and all other transmission methods over local and wide area networks, including but not limited to the Internet, Wi-Fi, Bluetooth, or Near-Field Communications, or insertion of media, a memory storage device, or a laptop, tablet, or phone via a socket or a cable.

In some aspects, the techniques described herein relate to a counting machine where the slots in a table corresponding to all possible user option sets have been filled by values derived from any, machine learning algorithm, for any size table, and any choice of learning algorithm and error function, including those that aggregate via ensemble methods any size array of expert and/or consumers-faced-with-decisions opinions on factor ratings per entity, whether or not the learning algorithm was designed to make reverse engineering on the underlying ratings by entity difficult.

In some aspects, the techniques described herein relate to a counting machine where the design of the machine is directed at preventing reverse engineering (back solving) for the underlying ratings.

In some aspects, the techniques described herein relate to a counting machine wherein all values pre-stored in the machine can be updated from time-to-time by any digital update mechanism, including but not limited to downloading, streaming and all other transmission methods over local and wide area networks, including but not limited to the Internet, Wi-Fi, Bluetooth, or Near-Field Communications, or insertion via a socket, a drive, or a cable of media, a memory storage device, or a laptop, tablet, or phone.

In some embodiments, certain aspects of the techniques described above may be implemented by one or more processors of a processing system executing software. The software comprises one or more sets of executable instructions stored or otherwise tangibly embodied on a non-transitory computer readable storage medium. The software may include the instructions and certain data that, when executed by the one or more processors, manipulate the one or more processors to perform one or more aspects of the techniques described above. The non-transitory computer readable storage medium may include, for example, a magnetic or optical disk storage device, solid state storage devices such as Flash memory, a cache, random access memory (RAM) or other non-volatile memory device or devices, and the such as. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media may include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes may be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A machine comprising:
   an electronic device, the electronic device has a display with a graphic user interface (GUI);
   a memory storage unit configured to store a table listing, initial values for integer constants N and M, and a plurality P of influencing factors, wherein P is an integer constant;
   a plurality of P influencing factors, each of the influencing factors are configured to be displayed to a user via the GUI in a first menu and a subset selected by the user from that menu, the selected influencing factors of the plurality of P influencing factors comprises a first set of N or less influencing factors to form a top ranking of at most N ranking values, a remaining of the P influencing factors subsequently displayed in a second menu from which a second set of M or less influencing factors to form a bottom rank of at most M ranking values; the second menu is adaptive to choices made in the first menu, wherein P is a value equal to or greater than a sum of N and M;
   the table listing having a unique cell for each unique combination able to be specified by a user given P, N, and M, wherein each cell stores a value;
   a processing unit; and
   an input-output device driver is electrically connected to the processing unit, the input-output device driver is configured transmit the top rank set and the bottom rank set to the processing unit, the processing unit to determine the index number of the table listing that corresponds to a mapping of the top rank and the bottom rank, the memory storage unit to retrieve a predetermined attribute preferences-to-entity ranking, which is the value stored in a unique one of the cells, associated with the mapping of the top rank and the bottom rank and transmit the predetermined attribute preferences-to-entity ranking to the display of the electronic device.

2. The machine of claim 1, wherein the table listing comprises one or more entries including corresponding answers for a user input selection.

3. The machine of claim 1, further comprising a digital two-way data transmission and update mechanism, configured to allow receipt by the machine of updated data values, including the values of N and M and the table entries, and to allow transmission by the machine to a specified receiver, the receiver specified in advance or at the time of transmission via a secure login, of all aspects of user interaction with the machine, including but not limited to all ranking choices made by the user and time spent in the interaction, where such data transmitted may be used to determine subsequent data updates to be received by the machine.

4. The machine of claim 1, further comprising:
   a calculation of revealed preferences is configured to be generated by looking up, in a pre-defined look-up table, stored in the memory storage unit, where an answer is given in the pre-defined look-up table by virtue of the pre-defined look-up table having entries and corresponding answers for a user input selection.

5. The machine of claim 1, further comprising a list of factors, a list of entities scored or ranked on the list of factors, actual scores or ranks of each item on each factor, values of N and M, and a pre-defined look-up table for every possible user action, is configured to be updated by a digital update mechanism, including but not limited to downloading, streaming, insertion of media or a memory storage device.

6. The machine of claim 1, wherein the machine is configured to be implemented for convenience on a digital computing device, including (but not limited to) a smart phone, a tablet, a personal computer, a dedicated kiosk, a common kiosk in a public place or a private commercial establishment, a computer server (dedicated or shared), or virtual computer server in a cloud.

7. The machine of claim 1, further comprising:
   a user answer is a single best choice of an item under consideration based on revealed factor preferences.

8. The machine of claim 7, wherein the user answer comprises a ranking of alternatives or a single best alternative.

9. The machine of claim 1, wherein if a ranking is presented, the user can choose a partial ranking, for example Top 3 choices, Top 4 choices, and so on.

10. The machine of claim 1, wherein if a ranking is presented, a type of the ranking presented to the user is Top K being no user choice, a value of "K" being set at a time the machine is created for a particular application and/or installed at a particular site.

11. The machine of claim 10, wherein the value of "K" can be updated from time-to-time by any digital update mechanism, including but not limited to downloading, streaming, insertion of media or a memory storage device.

12. The machine of claim 1, further comprising:
   individual user-selected choices of "N" top and "M" bottom factors, with ranks assigned by the user, are configured to be stored in the memory storage unit of the machine once entered initially, so that these values are automatically used every subsequent time the machine is used.

13. The machine of claim 1, further comprising:
a new set of selected factors and ranks is configured to be inputted and used instead of a currently saved option set to retain one or more saved option sets under user-supplied names, the machine configured to delete named option sets and to define a number of options sets and their names in advance, for potential use at a later date, and
wherein a total number of saved option sets is limited either by an available memory on the machine or by a pre-specified number "X", specified when the machine is constructed or installed, and
a value of "X" can be updated from time-to-time by any digital update mechanism, including but not limited to downloading, streaming, insertion of media or a memory storage device.

14. The machine of claim 1, further comprising:
an opt-out feature is configured to decline any options set or to delete a prior used option set or all named option sets.

15. The machine of claim 1, wherein if the machine is implemented on a multi-user or shared computing device, each user has their own set of stored option sets, with an opt-out option.

16. The machine of claim 1, further comprising:
user inputs are recorded individually and also aggregated, then used to create a data channel for sale on both a real-time and periodic basis, and data is configured to be transmitted via a data distribution mechanism.

17. The machine of claim 1, further comprising:
a built-in hardware counter is configured to limit usage to Y uses per user, the value of Y set initially to a pre-determined number of any size
an identity-checking mechanism configured to block one or more users from having multiple different accounts, and
wherein the value of "Y" can be updated by any digital update mechanism.

18. The machine of claim 1, further comprising:
one or more slots in a table correspond to user option sets filled by values derived from a machine learning algorithm for any size table and any choice of learning algorithm and error function, including those that are modified, manually or automatically, based on user usage and selection data transmitted by the machine, and those that aggregate via ensemble methods any size array of expert and/or consumers-faced-with-decisions opinions on ratings per entity, whether or not the learning algorithm was designed to make reverse engineering on an underlying rating of an entity difficult.

19. The machine of claim 1 further comprising:
a design of the machine is directed at preventing reverse engineering for one or more underlying ratings.

20. The machine of claim 1, further comprising:
one or more values pre-stored in the machine can be updated by any digital update mechanism such as downloading, streaming and all other transmission methods over local and wide area networks.

21. A computing device comprising:
a display with a graphical user interface (GUI);
a processor;
a memory storage unit configured to store a table of cells consistent with values established for constant integers M and N, each of the cells having a unique memory address and each storing a unique value;
a set of programmatic instructions stored on the memory storage unit and configured to be executed by the processor causing the computing device to:
display to a user via the GUI in a first menu the plurality of influencing factors;
select a first subset of N or less of the influencing factors as top ranking ones and receive a user provided integer rating of one, two, or three for each with tied rankings allowed;
display to the user via the GUI in a second menu a second menu subset of the plurality of influencing factors, wherein the subset excludes the top ranking ones;
select a second subset of M or less of the influencing factors as bottom ranking ones and receive a user provided integer rating of one, two, or three for each with tied rankings allowed,
wherein every unique possible combination of influencing factors, top and bottom ranking selections, and corresponding integer ratings corresponds to a unique one of the cells, which have been pre-populated with unique values, each representing a solution to a multiple criteria decision making (MCDM) problem, wherein the unique values are pre-populated utilizing a diffusion method of supervised machine learning that iteratively minimizes a Minkowski ($L[p]$) metric error function between evaluation slot values and machine learning estimated values;
utilizing the first subset and the second subset and related integer ratings to determine a unique one of the cells specifically associated with the first subset, the second subset, and related integer ratings;
retrieve the unique value of the determined unique one of the cells; and
display the unique value via the GUI as a solution to the MCDM problem.

22. A system for personalized ranking of entities on a rating scale of ordered categorical values, wherein quantized, confidential scores for factors of the entities are defined and used for the personalized ranking consistent with Multi-criteria Decision Making (MCDM) based mathematical calculations, wherein the personalized ranking is generated by the system in a manner expressly protecting external exposure of the quantized confidential scores from being reverse-engineered, said system comprising:
a server comprising:
a processor;
a data store comprising indexed records for a set of entities, each entity being a member of a collection of similar objects, wherein each entity comprises a plurality of defined factors, said plurality being a quantity of at least eight, each defined factor being associated with a factor specific numerical score established for the entity by a ranking source, wherein each factor specific numerical score is confidential, non-public value uniquely established by the ranking source to assist with ordering the entities in the collection relative to each other using a Multi-criteria Decision Making (MCDM) approach, where the defined factors are criteria used per the MCDM approach; and
server computer code stored in the data store and executable by the processor;

an end user computing device comprising a display with a graphic user interface (GUI) and a memory storage unit, wherein said electronic device communicates with said server over a network, wherein said end user computing device is configured to:
query the server for a specific one of the entities, which results in the electronic device receiving a plurality of influencing factors for the specific one of the entities, wherein each of said plurality of influencing factors corresponds to a one of the defined factors associated with the entity returned by the query;
display the influencing factors to a user via the GUI in a first menu;
receive via the GUI a user selection of a first user-selected set of N influencing factors, wherein the set of N influencing factors represents a top ranking set among all the influencing factors per preferences of the user, wherein for each of the N influencing factors, the user inputs via the GUI a corresponding top rank integer value between 1 and 3, wherein the top rank integer values indicate a relative ranked preference among the top ranked integer values with ties allowed;
display a subset of the influencing factors that excludes the N influencing factors to a user via the GUI in a second menu;
receive via the GUI a user selection of a second user-selected set of M influencing factors, wherein the set of M influencing factors represents a bottom ranking set among all the influencing factors per preferences of the user, wherein for each of the M influencing factors, the user inputs via the GUI a corresponding bottom rank integer value between 1 and 3, wherein the bottom rank integer values indicate a relative ranked preference among the bottom ranked integer values ties allowed;
the memory storage unit configured to store a user preference table of the top ranking set, corresponding top ranking integer values, bottom ranking set, and corresponding bottom ranking integer values;
transmitting the user preference table to the server;
the server computer code being configured to be executed by the server to:
execute a Multi-criteria Decision Making (MCDM) function to generate a tailored MCDM score for the vender based upon the user preference table and the plurality of defined factors and corresponding factor specific numerical scores, wherein the top ranking set and the top ranking integer values are used by the MCDM function mathematically biases the tailored score towards the top ranking set in accordance with the top ranking integer values and mathematically biases the tailored score against the bottom ranking set in accordance with the bottom ranking integer values;
generate a ranking for the entity from an enumerate list of ordered categorical values;
transmit the ranking to the end-user computing device for display within the GUI.

* * * * *